United States Patent Office 3,446,767
Patented May 27, 1969

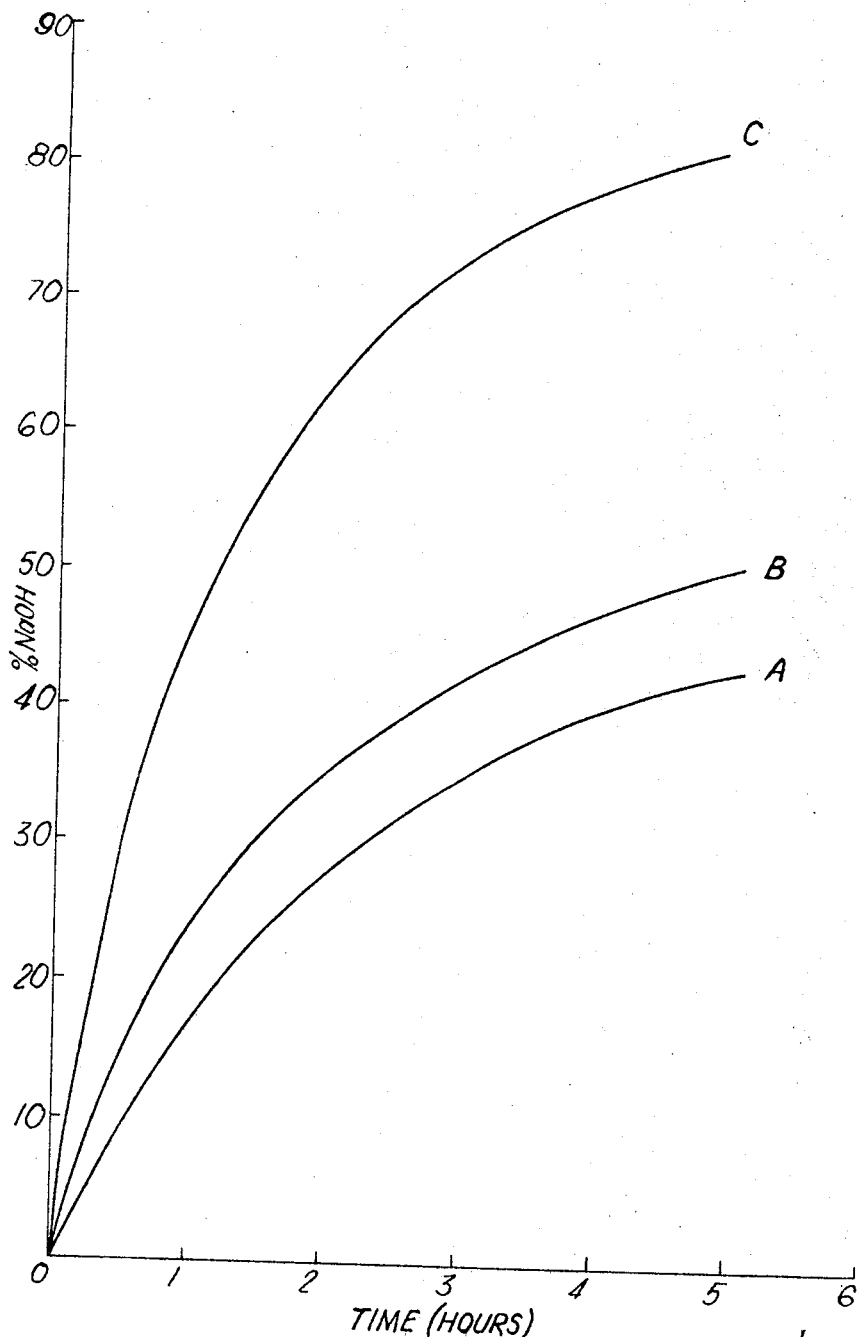

3,446,767
TERPOLYMER OF VINYL ACETATE-VINYL TERTIARY ACID ESTERS AND ACRYLATE, MALEATE OR FUMARATE ESTER
John Devereaux Nolan, Hayes, England, assignor to The Permutit Company Limited, London, England, a British company
Filed Mar. 18, 1966, Ser. No. 535,456
Claims priority, application Great Britain, Mar. 23, 1965, 12,309/65
Int. Cl. C08f 15/40; C09d 3/74
U.S. Cl. 260—29.6                12 Claims

ABSTRACT OF THE DISCLOSURE

Terpolymers of a major portion of (1) vinyl acetate, a minor proportion of (2) vinyl esters of a mixture of branched fatty acids of the formula

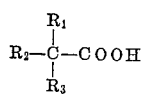

wherein $R_1$, $R_2$ and $R_3$ are saturated hydrocarbyl groups in which the total number of carbon atoms is 7 to 9 and (3) alkyl acrylates, dialkyl maleates or dialkyl fumarates which are useful as a film forming component in coating compositions and as adhesives.

---

The present invention is concerned with the preparation of a novel terpolymer and with the use of the terpolymer as a component of so-called emulsion paints, coating or protective films and adhesives.

Aqueous emulsions of polymeric material prepared by emulsion polymerisation techniques are extensively used as binding agents for emulsion paints. Such emulsions must have compatability with and a high binding power for pigments so that the finished paint has good scrub resistance, good colour stability and good weather resistance. Emulsions of polyvinyl acetate have been widely used, and general purpose paints based on these emulsions have been commercially successful; however polyvinyl acetate is readily hydrolysed under alkaline conditions, and therefore paints containing it cannot be applied to alkali-containing substrates such as new cement or absestos-cement. In addition, polyvinyl acetate is not a good film-forming polymer at low temperatures, and it is necesssary to plasticise it to improve its properties. This may be done either by incorporating a proportion of an external plasticiser, such as dibutyl phthalate, or by internal plasticisation by forming a copolymer of vinyl acetate and an acrylate, such as 2-ethyl hexyl acrylate. In neither case is the alkali resistance of an emulsion paint formed from the polymer or copolymer significantly improved.

A commercially available ethylenically-unsaturated polymerisable monomer is a mixture of the vinyl esters of acids having the general formula

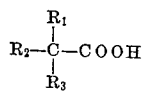

where the total number of carbon atoms in the three groups $R_1$ $R_2$ and $R_3$ is from 7 to 9. Proposals were made in the Journal of Oil and Colour Chemists Association, 1965, 48 at page 256 to polymerise such a monomer with vinyl acetate. The vinyl mixed esters themselves have an inert tertiary carbon atom and have very good alkali resistance when polymerised but are too expensive to be used by themselves. A copolymer of the vinyl mixed esters and vinyl acetate has better film-forming properties than polyvinyl acetate itself, and better alkali resistance, but to achieve suitably improved properties it is necessary that 30–40%, or even 50%, of the monomer mixture should be of the mixed vinyl esters; this is not economically viable. At the values of vinyl mixed esters content, for example 25%, at which the copolymer is commercially attractive, the internal plasticisation is insufficient, and it is necessary to add an external plasticiser, such as dibutyl phthalate. This reduces the alkali resistance of the copolymer.

It has been found that, by a quite unexpected synergistic action, the alkali resistance and film-forming ability of a copolymer of vinyl acetate and the vinyl esters of a mixture of branched fatty acids containing a total of 9 to 11 carbon atoms can be substantially improved by incorporating into the copolymer a proportion of an alkyl acrylate, a dialkyl maleate or a dialkyl fumarate. The degree of internal plasticisation conferred by the incorporation of one of these compounds, as evidenced by the film-forming ability of the terpolymer, is such that an external plasticiser is not necessary; the addition of a small proportion of plasticiser (for example 5%) may be desirable for other reasons, but such a very small addition will not appreciably affect the alkali resistance.

In forming the terpolymer, part of one expensive monomer in the known copolymer, namely the vinyl esters of the mixture of branched fatty acids, has thus effectively been replaced by a proportion of a cheaper monomer, namely the alkyl acrylate, dialkyl maleate or dialkly fumarate, and a product obtained which is not only cheaper than the known copolymer but also shows improved properties.

Based on these discoveries, the invention comprises a terpolymer formed from a major proportion of vinyl acetate, and minor proportions of the vinyl esters of a mixture of branched fatty acids containing a total of 9 to 11 carbon atoms, and of an alkyl acrylate, a dialkyl maleate or a dialkyl fumarate. Preferably the terpolymer contains from 50 to 80% by weight of vinyl acetate, from 10 to 25% of the vinyl esters of the mixture of tertiary branched fatty acids and from 5 to 25% of the alkyl acrylate, the dialkyl maleate or the dialkyl fumarate. The vinyl esters of the mixture of branched fatty acids may advantageously be the vinyl esters of acids having the general formula

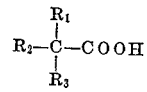

where the total number of carbon atoms in the three saturated hydrocarbyl groups $R_1$, $R_2$ and $R_3$ is from 7 to 9.

Suitable acrylate, maleate or fumarate esters are those in which the alkyl group contains up to 12 carbon atoms for example methyl, ethyl, n-butyl, n-hexyl, 2-ethyl hexyl, n-octyl and lauryl esters. It is preferred to use alkyl esters containing up to 8 carbon atoms and most preferably those having longer chains within the range $C_1$–$C_8$, for example $C_6$–$C_8$, as exemplified by the n-hexyl or 2-ethyl hexyl esters.

Terpolymers according to the invention are especially of use in the formulation of compositions for paints. In general use can be made of their film-forming properties. They may readily be formed by conventional emulsion polymerisation techniques or by a technique in which the monomer mixture is pre-emulsified, and the polymerisation carried out by adding this emulsion slowly to a stirred aqueous solution of catalyst and emulsifying agent. One example of the delayed addition technique is called "pre-emulsification" and is particularly valuable because, contrary to conventional practice, it is not essential to incorporate a water-soluble protective colloid to stabilize the emulsion during preparation or subsequent storage.

The absence of colloid, as well as providing a considerable saving in cost, decreases the water sensitivity of a dried film of the emulsion so that penetration of alkali into the film is much reduced, and the alkali resistance still further increased. The pigment-binding power of the emulsion is also increased since coalesence of the polymer particles can occur more readily.

Examples will now be given of the preparation of the terpolymers and of paints, protective coatings, decorative coating and adhesives containing them.

Example 1 describes the preparation of the preferred terpolymer in the form of an aqueous emulsion using the "pre-emulsification" technique, and comparisons made between this terpolymer and a conventional copolymer of vinyl acetate and 2-ethyl hexyl acrylate, both as dried films and as paints.

Example 1

130 lbs. of water was charged to a glass-lined vessel equipped with stirrer, reflux condenser, thermometer, and a heating jacket. 1.2 lbs. of sodium lauryl sulphate and 2 ozs. of sodium bicarbonate were dissolved in the water with stirring and the temperature raised to 80° C. 6 ozs. of potassium persulphate was then added.

In another glassed-lined vessel equipped with a high-speed stirrer 12 ozs. of sodium lauryl sulphate, 4 lbs. of an alkyl phenyl polyglycol ether prepared by condensing nonyl phenol with ethylene oxide, sold under the trade mark Ethylan BCP, 2 lbs. sodium bicarbonate and 5 lbs. of potassium persulphate were dissolved in 319 lbs. water. In a third glass-lined vessel 400 lbs. vinyl acetate, 109 lbs. of the vinyl esters of mixed branched $C_9$–$C_{11}$ acids sold under the trade mark "Vinyl ester of Versatic 911" and 32.5 lbs of 2-ethyl hexyl acrylate were well mixed and then stirred into the solution in the second glass vessel, the high-speed stirrer being used to form a stable emulsion.

This emulsion was then steadily added to the contents of the first glass vessel over a period of 3–4 hours, the temperature being maintained at 80° C. Fifteen minutes after all the emulsion had been added the temperature of the reaction vessel was raised to 90° C. and this temperature maintained for one hour. After cooling to room temperature the product was ready for use and had a viscosity of 70 cps. at a shear rate of 24.9 sec.$^{-1}$ measured on a Ferranti-Shirley viscometer.

By way of comparison, an emulsion was formed of a copolymer of vinyl acetate and 2-ethyl hexyl acrylate only, prepared in the conventional manner in which the monomers are not pre-emulsified. A water-soluble protective colloid had to be added to ensure the stability of the emulsion. Thus, 449 lb. of water was charged to a glass-lined vessel equipped with stirrer, reflux condenser, thermometer, and a heating jacket. To this water was added 2 lb. of sodium lauryl sulphate, 4 lb. of Ethylan BCP, 2 lbs. 2 oz. sodium bicarbonate, 15 oz. of potassium persulphate and 10 lb. of a hydroxyethyl ether of cellulose produced by reacting cellulose with ethylene oxide, sold under the trade mark Natrosol 250L and the mixture stirred and heated at 60° C. until a clear solution was obtained. In another glass-lined vessel 1 lb. of potassium persulphate was dissolved in 100 lb. of water. In a third glass-lined vessel 433 lb. of vinyl acetate was mixed with 108 lbs. of 2-ethyl hexyl acrylate. 81 lb. of this mixture of monomers was then stirred into the main solution and the temperature of the mixture slowly raised to 80° C. The rest of the monomer mixture and the persulphate solution was then added slowly over a period of 3 hours with the temperature at 80° C. Fifteen minutes after completion of the addition the temperature was raised to 90° C. and this temperature maintained for one hour. The viscosity of the resultant emulsion was 400 cps. at a shear rate of 24.9 sec.$^{-1}$ measured on a Ferranti-Shirley viscometer.

Dried films were prepared of the two emulsions. That formed from the terpolymer according to the invention had the greater optical clarity, and showed no sign of whitening 10 minutes after being spotted with water after 1 hour it showed a slight haze, but was still tough and could be scratched only with difficulty. The comparison film was completely opaque 10 minutes after being spotted with water, and broke up completely into a white slurry on gentle rubbing 1 hour after being spotted.

Paints, at a pigment volume concentration of 40%, were made up in the conventional manner from the emulsion of the terpolymer according to the invention and from the comparison emulsion, and applied to hardboard panels previously sealed with a flat alkyd undercoat and dried for 24 hours. The panels were then scrubbed with a one pound brush and a solution of 1% of a commercial sodium $C_8$–$C_{18}$ alkyl sulphate solution (sold under the trademark "Teepol") in N/10 sodium hydroxide. The paint prepared from the terpolymer was unaffected after 40 minutes and 2000 scrubs, while the other rapidly crinkled, broke away from the undercoat and was almost wholly destroyed after 20 minutes and 1000 scrubs.

An example will now be given of typical formulations for emulsion paints, using the emulsion of the terpolymer prepared in Example 1. All parts are by weight.

EXAMPLE 2

|  | Low cost interior flat paint | Quality interior or exterior flat paint | Quality semi-gloss paint |
|---|---|---|---|
| Pigment grade titanium dioxide | 5.0 | 21.0 | 19.5 |
| Lithopone pigment (60% ZnS) |  | 8.0 | 2.0 |
| Lithopone pigment (30% ZnS) | 7.5 |  |  |
| Calcium carbonate | 25.0 | 4.0 | 1.0 |
| Barytes | 1.5 | 3.0 | 1.0 |
| China clay | 4.0 | 2.2 | 1.0 |
| Powdered mica | 1.4 | 3.0 | 1.0 |
| Sodium hexa metaphosphate | 0.04 | 0.05 | 0.04 |
| Hydroxyethyl methyl cellulose | 10.2 | 8.0 | 6.4 |
| Butyl cellosolve acetate |  | 0.3 | 0.4 |
| Dibutyl phthalate | 0.7 |  |  |
| Water | 20.62 | 21.0 | 11.5 |
| Emulsion | 24.04 | 29.45 | 56.16 |
| Total | 100 | 100 | 100 |

Each of these paints had a good feel under the brush, showed good levelling, and excellent scrub resistance. The quality exterior paint showed excellent resistance to weathering on both asbestos and cement panels, without excessive pick-up or dirt. The semi-gloss paint showed similar properties and a good semi-gloss, giving a reflectance of 40% compared with a figure of 20% for a similar paint made from a conventional polyvinyl acetate homoploymer at the same pigment volume concentration. In general emusion paints incorporating a terpolymer according to the invention will contain from 40 to 45% by volume of pigment.

The next example shows the formation of a protective coating from the terpolymer emusilon prepared in Example 1.

Example 3

A sheet of clean mild steel was degreased and then coated with the emulsion by dipping and draining, the excess water being allowed to evaporate. The coated sheet was then exposed to a corrosive atmosphere for six months. At the end of this time no sign of corrosion or rust was visible at all. An uncoated sheet exposed similarly as a control had rusted within 24 hours and was heavily corroded at the end of the six months.

The terpolymer may be used as a decorative coating, and this is shown in the following example.

Example 4

An emulsion of the terpolymer prepared according to Example 1 and containing 40% of solids, was applied by brush to a coloured and patterned non-washable wallpaper. After drying for 24 hours the wallpaper had a slightly glossy finish and could be washed with a wet sponge without penetration of water through the polymer film to the paper, which remained unharmed. A layer of butter, to represent typical household soiling, was applied to the coated wallpaper. The butter had not penetrated the coating after 48 hours, and was easily washed off without a stain.

The terpolymer according to the invention may be employed as an adhesive in the form of an emulsion, or in the form of powder or fine beads which require to be heat sealed to a substrate, or a solution in a solvent. The terpolymers have proved especially of value for glueing materials such as wood, paper, fibers, and plastic foams, particularly where alkali resistance is required, and for the basis of adhesives for fashionable heavy plastic wallpapers. Powders or fine beads can easily be produced by the standard techniques of suspension of polymerisation, and if a solution of terpolymer is required these powders can be dissolved in a suitable solvent; an adhesive may be an emulsion or a solution of the terpolymer, or the powders themselves can be scattered onto a substrate, and fused to it, or used directly to bond two layers of material under suitable conditions of temperature and pressure, for example 110° C. Solution or emulsion adhesives may additionally be thickened or cheapened by the use of polyvinyl alcohol, starch or cellulose thickeners and these can be used with the terpolymer.

The following is an exampe of the use of a terpolymer according to the invention as an adhesive.

Example 5

The emulsion of terpolymer prepared in Example 1 was coated onto a strip of ordinary cartridge paper at an approximate level of 5 gm. per square metre of paper (calculated on dry emulsion solids) by means of a bar coater, and dried in a forced-draught oven. The coated face of the strip was placed in contact with an uncoated strip and passed through rolls heated to 110° C. An excellent bond resulted and attempts to break it resulted only in the tearing of the paper.

To demonstrate the superior alkali resistance of the terpolymers according to the invention compared with that of a copolymer of vinyl acetate and 2-ethyl hexyl acrylate, and of a copolymer of vinyl acetate and vinyl esters of a mixture of branched chain fatty acids containing a total of 9 to 11 carbon atoms, samples of each were tested according to a method essentially similar to that described in FATIPEC Congress Journal 1964, 7, 149. This method involves hydrolysis of the polymer with sodium hydroxide, the percentage of the sodium hydroxide used up during the test being a measure of the hydrolysis of the polymer, and hence inversely of its alkali resistance. The accompanying drawing shows a graphical plot of the sodium hydroxide used against time.

As has been stated above, the plasticisation and alkali resistance of copolymers of vinyl acetate and the vinyl esters of a mixture of branched acids containing nine to eleven carbon atoms depends on the proportion of these mixed esters. Good alkali resistance is achieved at a relatively low content of vinyl esters of mixed branched acids, but a relatively high content is required to achieve adequate plasticisation as well. At relatively low contents, external plasticisation is necessary, with reduction of alkali resistance. With the terpolymer according to the invention adequate alkali resistance and good film formation are combined with economic viability. Therefore, to obtain a valid comparison between the polymers, a copolymer of vinyl acetate and 2-ethyl hexyl acrylate was selected which had commercially acceptable film-forming properties, and a terpolymer according to the invention was selected which had a commercially acceptable price; the copolymer of vinyl acetate and the vinyl esters of the mixed branched acids was then chosen to have the same price as the terpolymer. The compositions of the three polymers were 80% vinyl acetate/20% 2 ethyl hexyl acrylate, 74% vinyl acetate/20% vinyl esters of mixed branched acids/6% 2-ethyl hexyl acrylate, and 75% vinyl acetate/25% vinyl esters of mixed branched acids respectively.

It can readily be seen from the graph that the terpolymer according to the invention (curve A) has superior alkali resistance to the copolymer of vinyl acetate and vinyl mixed esters (curve B), and to the copolymer of vinyl acetate and 2-ethyl hexyl acrylate (curve C). In practice, in a paint or coating, the superiority of the terpolymer over the copolymer of vinyl acetate and vinyl mixed esters will be more marked because the latter would need external plasticisation to confer adequate film-forming properties on it, and external plasticisation reduces alkali resistance. The terpolymer is adequately plasticised internally and requires no external plasticisation.

It should be mentioned that polyvinyl acetate homopolymer with suitable external plasticisation would fare considerably worse on this test than any of the three polymers shown.

I claim:

1. A random, linear addition terpolymer formed from a mixture of monomers consisting of:
   (A) 50 to 80 wt. percent of vinyl acetate,
   (B) 10 to 25 wt. percent of vinyl esters of a mixture of branched fatty acids of the formula,

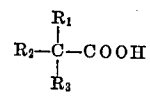

wherein $R_1$, $R_2$ and $R_3$ are saturated hydrocarbyl and the total number of carbon atoms in such groups is 7 to 9, and
   (C) 5 to 25 wt. percent of a monomer selected from the group consisting of alkyl acrylates, dialkyl maleates and dialkyl fumarates.

2. A terploymer according to claim 1 in which each alkyl group in the monomer selected from the group consisting of alkyl acrylates, dialkyl maleates and dialkyl fumarates contains up to twelve carbon atoms.

3. A terpolymer according to claim 2 in which each alkyl group in the monomer selected from the group consisting of alkyl acrylates, dialkyl maleates and dialkyl fumarates contains up to eight carbon atoms.

4. A terpolymer according to claim 3 in which each alkyl group in the monomer selected from the group consisting of alkyl, acrylates, dialkyl maleates and dialkyl fumarates contains from six to eight carbon atoms.

5. A terpolymer according to claim 1, formed from a mixture of monomers consisting of 60 to 80% by weight of vinyl acetate, 10 to 25% of the vinyl esters of the mixture of tertiary branched fatty acids, and 5 to 10% of 2-ethyl-hexyl acrylate.

6. A terpolymer according to claim 1 formed from a mixture of monomers consisting of 60 to 80% by weight of vinyl acetate, 10 to 25% of the vinyl esters of the mixture of tertiary branched fatty acids, and 5 to 10% of 2-ethyl-hexyl arylate.

7. An aqueous emulsion of the terpolymer according to claim 1.

8. A method of preparing the aqueous emulsion according to claim 8 comprising emulsifying a mixture of 50 to 80% by weight of vinyl acetate, 10 to 25% of a mixture of vinyl esters of tertiary branched fatty acids containing a total of 9 to 11 carbon atoms of the formula

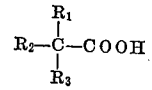

wherein $R_1$, $R_2$ and $R_3$ are saturated hydrocarbyl groups and 5 to 25% of a monomer selected from the group consisting of alkyl acrylates, dialkyl maleates and dialkyl fumarates, each alkyl group of which contains up to 12 carbon atoms, in an aqueous medium and adding such emulsified mixture to a stirred aqueous solution of an emulsifying agent and an effective amount of a polymerization catalyst.

9. An aqueous emulsion of a terpolymer prepared by the process of claim 9.

10. An emulsion paint comprising as an essential film forming constituent, an effective amount of the emulsion according to claim 7 and about 40 to 45% by volume of pigment.

11. A coating comprising the terpolymer according to claim 1 as the essential film forming component.

12. An adhesively bonded joint between the surfaces of at least one material selected from the group consisting of paper, wood, fibers and plastic foams, comprising the terpolymer according to claim 1 as the essential adhesive bonding agent.

References Cited

UNITED STATES PATENTS

| | | | |
|---|---|---|---|
| 2,544,692 | 3/1951 | Kugler et al. | 117—122 |
| 2,628,198 | 2/1953 | Arundale et al. | 262—56 |
| 2,636,024 | 4/1953 | Wolf | 260—80.5 |
| 3,014,881 | 12/1961 | La Barre | 260—18 |

OTHER REFERENCES

Journal of Oil and Color Chemistry Assoc.: 48, 256.

JOSEPH L. SCHOFER, *Primary Examiner.*

S. M. LEVIN, *Assistant Examiner.*

U.S. Cl. X.R.

117—123, 126, 132, 155; 161—250; 260—41, 78.5, 80.81, 85.7, 86.1